(12) United States Patent
Beeram et al.

(10) Patent No.: US 10,693,766 B2
(45) Date of Patent: *Jun. 23, 2020

(54) ENGINES TO PRUNE OVERLAY NETWORK TRAFFIC

(71) Applicant: Hewlett Packard Enterprise Development LP, Houston, TX (US)

(72) Inventors: Suresh Kumar Reddy Beeram, Bangalore (IN); Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,831

(22) Filed: Jan. 28, 2019

(65) Prior Publication Data
US 2019/0158381 A1 May 23, 2019

Related U.S. Application Data

(63) Continuation of application No. 15/504,317, filed as application No. PCT/IN2015/000030 on Jan. 19, 2015, now Pat. No. 10,218,604.

(51) Int. Cl.
*H04L 29/12* (2006.01)
*H04L 12/761* (2013.01)
(Continued)

(52) U.S. Cl.
CPC .............. *H04L 45/16* (2013.01); *H04L 12/18* (2013.01); *H04L 12/1886* (2013.01);
(Continued)

(58) Field of Classification Search
CPC ....... H04L 12/761; H04L 12/18; H04L 29/12; H04L 29/2906; H04L 12/753; H04L 12/931; H04L 12/46; H04L 12/823
See application file for complete search history.

(56) References Cited

U.S. PATENT DOCUMENTS

2010/0002702 A1   1/2010  Saito et al.
2011/0299529 A1  12/2011  Olsson et al.
(Continued)

FOREIGN PATENT DOCUMENTS

CN       103973825 A     8/2014
WO    WO-2011156256 A1  12/2011
(Continued)

OTHER PUBLICATIONS

D. Rao and V. Jain, "L3VPN Virtual Network Overlay Multicast," Internet Draft, Jul. 16, 2013, pp. 1-10, IETF Trust.
(Continued)

*Primary Examiner* — Chi Ho A Lee
*Assistant Examiner* — Andrew Lee

(57) ABSTRACT

An example system in accordance with an aspect of the present disclosure includes an inspection engine and a forwarding engine. The inspection engine is to identify whether a tunneled network packet is associated with the multicast group address and a VNI that is contained in the mapping table. The forwarding engine is to forward or discard the packet in response to whether the VNI is contained in the mapping table.

20 Claims, 5 Drawing Sheets

(51) Int. Cl.
*H04L 12/46* (2006.01)
*H04L 12/18* (2006.01)
*H04L 12/753* (2013.01)
*H04L 12/823* (2013.01)
*H04L 12/931* (2013.01)
*H04L 29/06* (2006.01)

(52) U.S. Cl.
CPC ...... *H04L 12/4633* (2013.01); *H04L 12/4641* (2013.01); *H04L 45/48* (2013.01); *H04L 47/32* (2013.01); *H04L 49/70* (2013.01); *H04L 61/2069* (2013.01); *H04L 69/22* (2013.01); *H04L 2212/00* (2013.01)

(56) References Cited

U.S. PATENT DOCUMENTS

| | | | |
|---|---|---|---|
| 2013/0100854 A1* | 4/2013 | Tatikonda | H04L 12/4675 370/254 |
| 2013/0176906 A1 | 7/2013 | Friskney et al. | |
| 2013/0188489 A1 | 7/2013 | Sato | |
| 2013/0201986 A1 | 8/2013 | Sajassi et al. | |
| 2014/0254590 A1 | 9/2014 | Yang et al. | |
| 2015/0055651 A1 | 2/2015 | Shen et al. | |
| 2015/0063353 A1* | 3/2015 | Kapadia | H04L 45/745 370/392 |
| 2015/0156108 A1 | 6/2015 | Shi | |
| 2015/0280932 A1 | 10/2015 | Kobayashi | |
| 2015/0341183 A1 | 11/2015 | Song et al. | |
| 2015/0372828 A1 | 12/2015 | Hao et al. | |
| 2016/0149795 A1 | 5/2016 | Kang et al. | |
| 2016/0149808 A1 | 5/2016 | Cai et al. | |
| 2016/0328342 A1 | 11/2016 | Kim | |
| 2017/0078115 A1* | 3/2017 | Zhou | H04L 12/6418 |

FOREIGN PATENT DOCUMENTS

| | | |
|---|---|---|
| WO | WO-2013182924 | 12/2013 |
| WO | WO-2013182924 A1 | 12/2013 |
| WO | WO-2014210483 A1 | 12/2014 |

OTHER PUBLICATIONS

International Search Report, International Application No. PCT/IN2015/000030, dated Oct. 9, 2015, pp. 1-4, SIPO.

M. Lasserre et al., "Framework for Data Center (DC) Network Virtualization," Request for Comments: 7365, Oct. 2014, pp. 1-24, IETF.

* cited by examiner

US 10,693,766 B2

ENGINES TO PRUNE OVERLAY NETWORK TRAFFIC

CROSS REFERENCE TO RELATED APPLICATION

This application is a continuation of co-pending U.S. patent application Ser. No. 15/504,317 filed Feb. 15, 2017, the entire contents of which are hereby incorporated by reference as though fully set forth herein.

BACKGROUND

Tenant networks within a data center may support virtual machine (VM) mobility, e.g., on networks instantiated across a server farm at different rack locations. The tenant networks may be virtualized, such that the underlying physical networks may be kept intact without needing to physically reconfigure the underlying network infrastructure to accommodate extending these tenant networks across the server farm. Tunneling schemes, such as virtual extensible local area network (VxLAN), may be used to extend these tenant networks across the underlay layer three (L3) fabric, and therefore tenant networks also may be referred to as overlay networks.

BRIEF DESCRIPTION OF THE DRAWINGS/FIGURES

DETAILED DESCRIPTION

In an environment having multiple tenant networks, overlapping internet protocol (IP) multicast groups may involve broadcast/unicast/multicast (BUM) network traffic of one overlay network being sent to network devices (e.g., VxLAN termination endpoints (VTEPs)) registered to that IP multicast group. However, network segments connecting to such network devices that are not associated with this overlay network may see superfluous traffic, in view of the BUM traffic being sent to the multicast group. Further, the receiving network device (e.g., VTEP) would need to perform filtering based on such superfluous overlay network information, burdening the network device unnecessarily. For example, an upstream router may send multicast traffic to downstream links, and with multiple virtual local area networks (VLANs), the multicast traffic would be duplicated.

Examples described herein enable optimized network traffic handling in the underlay, e.g., based on pruning BUM traffic according to virtual network identifiers (VNIs). Thus, examples may efficiently optimize and/or reduce overlay and/or underlay network BUM traffic. In an example, additional information (VNI membership to multicast group) may be sent along with tunneled packets, to populate traffic-to-port action rules (drop, forward, mirror, etc.) of network devices and avoid superfluous traffic from being sent through the network.

Figure 1:
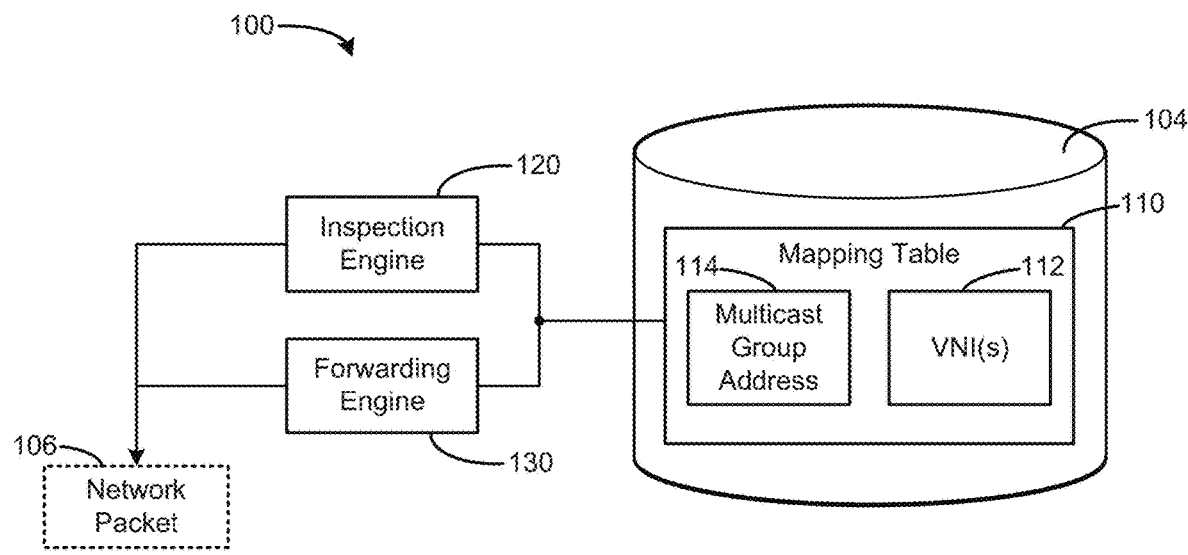
FIG. 1 is a block diagram of a network device including an inspection engine, a forwarding engine, and a mapping table according to an example.

FIG. 1 is a block diagram of a network device 100 including an inspection engine 120, a forwarding engine 130, and a mapping table 110 according to an example. Network device 100 is to interact with network packet 106 and storage 104. Storage 104 includes the mapping table 110, which includes a virtual network identifier (VNI) 112 and a multicast group address 114.

Example underlay devices (e.g., switches and routers), such as network device 100, thus may avoid wasted underlay bandwidth, by being provided with such information as the VNI 112 and multicast group address 114 included in the mapping table 110, e.g., for the tenant networks (VNI) that correspond to the IP multicast group. Example network devices 100, such as switches and routers, may use this information to prune traffic from flowing down superfluous paths in the network.

More specifically, the mapping table 110 is to contain a mapping between an underlay network multicast group address 114, and at least one virtual network identifier (VNI) 112 corresponding to an overlay network. The inspection engine 120 is to identify whether a tunneled network packet, such as network packet 106 received at the network device 100, is associated with the multicast group address 114 and a VNI 112 that is contained in the mapping table 110. The forwarding engine 130 is to forward the packet 106 according to the multicast group address 114 in response to the VNI 112 being contained in the mapping table 110, and to discard (e.g., prune) the packet 106 in response to the VNI 112 not being contained in the mapping table 110. Examples are described in terms of discarding packets. In alternate examples, other actions may be performed in response to a network packet/traffic, such as incident logging or other notifications to inform a network administrator regarding network traffic (e.g., network packets being forwarded for given VNIs unnecessarily).

Storage 104 may be accessible by the network device 100, to serve as a computer-readable repository to store information such as the mapping table 110 that may be referenced by the engines 120, 130. As described herein, the term "engine" may include electronic circuitry for implementing functionality consistent with disclosed examples. For example, engines 120 and 130 represent combinations of hardware devices (e.g., processor and/or memory) and programming to implement the functionality consistent with disclosed implementations. In examples, the programming for the engines may be processor-executable instructions stored on a non-transitory machine-readable storage media, and the hardware for the engines may include a processing resource to execute those instructions. An example system (e.g., a computing device), such as network device 100, may include and/or receive tangible non-transitory computer-readable media storing computer-readable instructions. As used herein, the processor/processing resource may include one or a plurality of processors, such as in a parallel processing system, to execute the processor-executable instructions. The memory can include memory addressable by the processor for execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

In some examples, the functionality of engines 120, 130 may correspond to operations performed in response to, e.g., information from storage 104, packet 106, user interaction, e.g., as received from a network administrator configuring the engines 120, 130 and/or the storage 104, and so on. The storage 104 may be accessible by the network device 100 as a computer-readable storage media, in which to store items in a format that may be accessible by the engines 120, 130.

Examples enable readily apparent signaling from a device and/or tenant, to identify which multicast group the device is to be registered to, and what its recipient identification (ID) is. Examples may rely on the use of ubiquitous protocols, such as Internet group management protocol (IGMP), multicast listener discovery (MLD), protocol-independent multicast (PIM), and others, to communicate such information. IGMP may be used with multicast bridging, and PIM may be used with multicast routing, for example. Such information may be communicated to network devices (e.g., switches and/or routers), to use such information in forwarding and/or pruning of network traffic (e.g., may use it to build a multicast tree).

Examples may be extended to Internet Protocol (IP)-based underlay networks, such as IPv4 and/or IPv6. A new control plane protocol is not needed, to convey VNI information to the underlay networks, because examples can dovetail into existing protocols/messaging schemes such as IGMP, MLD, PIM, and so on. Pruning traffic on links that do not need that traffic allows for better link utilization and energy savings. Examples also may insert VNI information to be available in the packet headers in frames of data plane packets such as VxLAN tunneled packets (e.g., in a VxLAN header located near a User Datagram Protocol (UDP) header). Thus, deep packet processing capability is not needed in network devices to fetch this information, because most existing network processors (e.g., application specific integrated circuits (ASICs)) are already capable of scanning at a depth into the layer-4 (L4) packet headers to reach the example information. Examples are applicable to data center deployment as well as campus Unified Wired and Wireless (UWW) solutions where wireless clients use a VM-like mobility type of support.

Examples described herein are not limited to VxLAN as an encapsulation format, and can apply to other overlay tunneling schemes. For example, protocols such as network virtualization generic routing encapsulation (NVGRE), generic network virtualization encapsulation (GENEVE), and others may be used.

Figure 2:
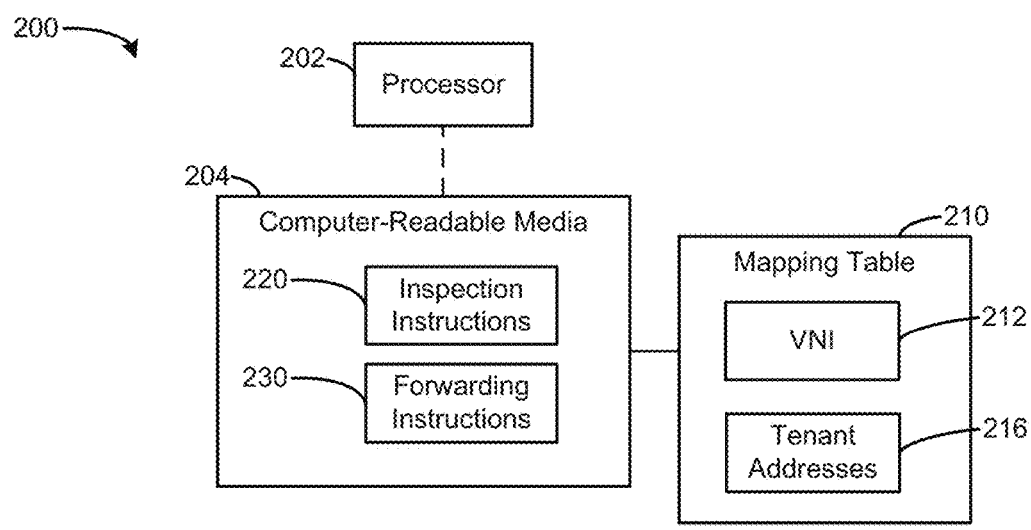
FIG. 2 is a block diagram of a system including inspection instructions, forwarding instructions, and a mapping table according to an example.

FIG. 2 is a block diagram of a system 200 including inspection instructions 220, forwarding instructions 230, and a mapping table 210 according to an example. The system 200 of FIG. 2 may also include a processor 202 and computer-readable media 204, associated with the instructions 220, 230, and which may interface with the mapping table 210. In some examples, operations performed when instructions 220, 230 are executed by processor 202 may correspond to the functionality of engines 120, 130 of FIG. 1. In FIG. 2, the operations performed when inspection instructions 220 are executed by processor 202 may correspond to functionality of inspection engine 120 (FIG. 1). Similarly, the operations performed when forwarding instructions 230 are executed by processor 202 may correspond to functionality of forwarding engine 130 (FIG. 1).

As set forth above with respect to FIG. 1, engines 120, 130 may include combinations of hardware and programming. Such components may be implemented in a number of fashions. For example, the programming may be processor-executable instructions stored on tangible, non-transitory computer-readable media 204 and the hardware may include processor 202 for executing those instructions 220, 230. Processor 202 may, for example, include one or multiple processors. Such multiple processors may be integrated in a single device or distributed across devices. Media 204 may store program instructions, that when executed by processor 202, implement network device 100 of FIG. 1. Media 204 may be integrated in the same device as processor 202, or it may be separate and accessible to that device and processor 202. The mapping table 210 may be a hardware implementation of a mapping tree data structure, such as a device-specific implementation of that portion of the mapping tree network to which system 200 belongs.

In some examples, program instructions can be part of an installation package that when installed can be executed by processor 202 to implement system 200. In this case, media 204 may be a portable media such as a CD, DVD, flash drive, or a memory maintained by a server from which the installation package can be downloaded and installed. In another example, the program instructions may be part of an application or applications already installed. Here, media 204 can include integrated memory such as a hard drive, solid state drive, or the like. While in FIG. 2, media 204 includes instructions 220, 230, one or more instructions may be located remotely from media 204. Conversely, although FIG. 2 illustrates mapping table 210 located separate from media 204, the mapping table 210 may be included with media 204.

The computer-readable media 204 may provide volatile storage, e.g., random access memory for execution of instructions. The computer-readable media 204 also may provide non-volatile storage, e.g., hard disk or solid state disk for storage. Components of FIG. 2 may be stored in any type of computer-readable media, whether volatile or non-volatile. Content stored on media 204 may include images, text, executable files, scripts, or other content that may be used by examples as set forth below. For example, media 204 may contain configuration information or other information that may be used by engines 120, 130 and/or instructions 220, 230 to provide control or other information.

Figure 3:
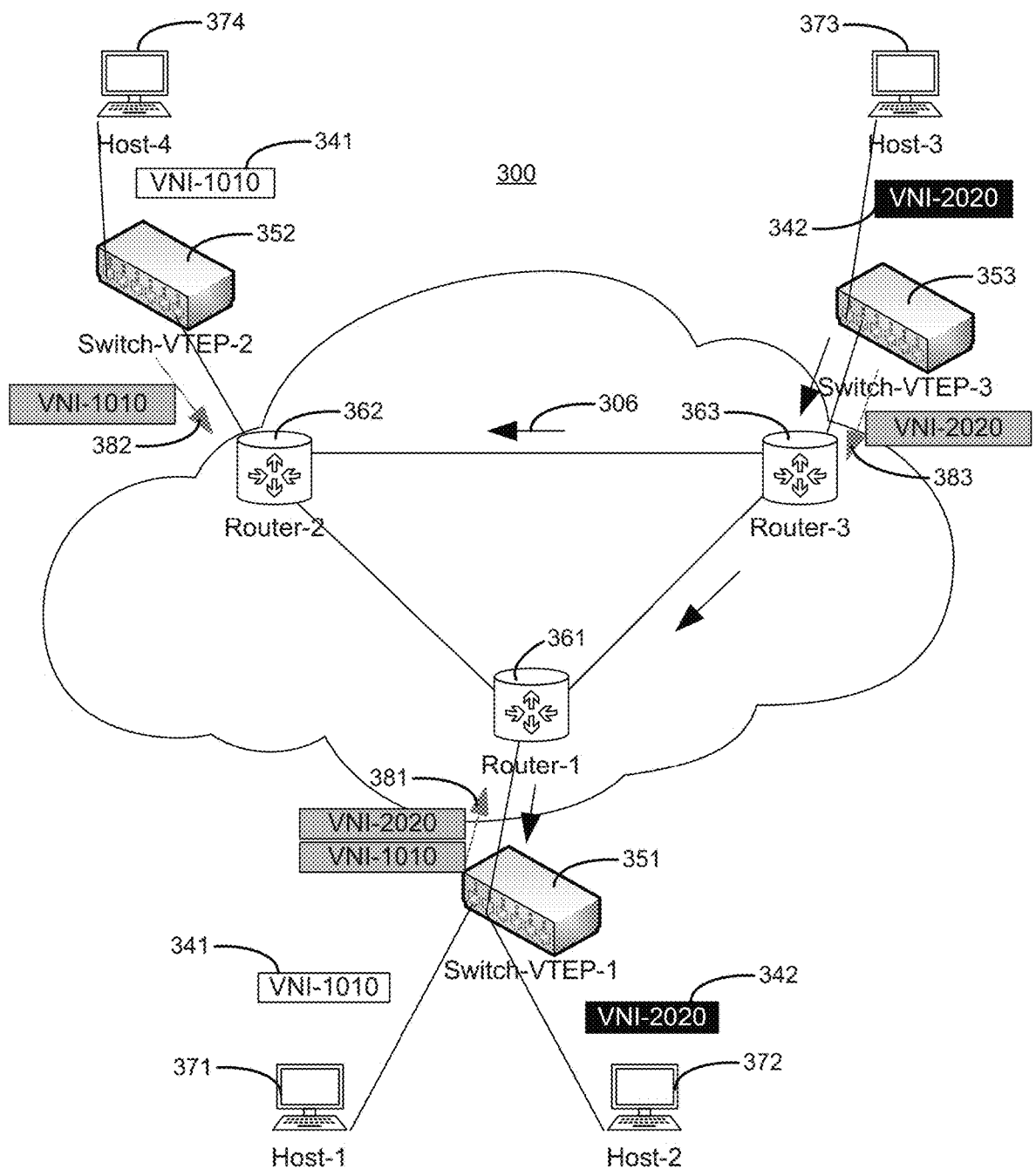
FIG. 3 is a block diagram of a system including a plurality of overlay networks, network devices, and tenants according to an example.

FIG. 3 is a block diagram of a system 300 including a plurality of overlay networks 341, 342, network devices 351-353, 361-363, and tenants 371-374 according to an example. Routers 361-363 are physically coupled to form an underlay network to exchange network traffic 306, and are associated with overlay networks 341, 342 including switches 351-353 and tenants 371-374. The switches 351-353 may send join reports 381-383 to the routers 361-363.

Generally, the physical network may be referred to as the underlay, and the logical network may be referred to as an overlay. The physical network tends to be relatively more static in nature, corresponding to wiring, configuration of IP addresses, route table entries, and so on. In contrast, overlays tend to be more dynamic, and may come and go, e.g., as their tenants come and go. Such logical networks may be set up and taken down without a need to configure physical networking components of the underlying physical network. Thus, an example networking device may embed VNI information into multicast traffic, and send packets of that traffic to a multicast group address to be distributed and processed by the example forwarding and inspection engines described herein.

A given network topology may call for a given approach to deployment of network devices according to examples described herein. Some deployments may be based on network switches and/or network routers. An example VxLAN network deployment may include switches that include a vswitch and/or a pswitch. A vswitch is a virtual, software-based switch executed on a network server, which may serve as a VxLAN termination point. Another example of a switch is a top-of-rack switch in a datacenter environment, which can be an L2 switch that may behave as a VxLAN termination point. Example approaches enable the multiplexing of multiple virtual networks (having multiple corresponding VNIs) on the same multicast group, and pruning/filtering network traffic using routers, vswitches, and/or pswitches to drop unnecessary traffic. Thus, a network device as described herein may include any device that hosts tenants, such as a server, a vswitch, a pswitch, a router, and so on.

The example topology shown in FIG. 3 is simplified, e.g., showing a single line (link) between Router-1 361 and switch-VTEP-1 351. However, multiple devices may be involved in a given topology, more than the single switch and router having a single link as shown in FIG. 3. Examples may therefore provide further benefits in avoiding superfluous traffic along a given link/device for more complex topologies. For example, a three-tier topology (having a distribution layer and an access layer sitting behind a router) may have at least three hops between a client/tenant and the router. Thus, potential savings/benefits are magnified by three for such larger/more complex topologies, in view of pruning earlier along the links (e.g., at the VTEPs) to stop superfluous traffic from flowing on downstream links/devices.

For example, pruning may occur at the edge of a network, e.g., at a VTEP that may be a top-of-rack switch, connected to a server through a one-hop layer switch. Examples also enable pruning to be taken deeper into the core of the network, where participating PIM routers, typically connected through L3 switches or routers, may implement the examples described herein to understand the VNI information and/or build a corresponding distribution tree. Accordingly, the various example benefits may be enjoyed without a need to change an entire network (e.g., no need to change every network node). For benefits at the network edge, the VTEPs may be modified to implement the example features, and for the core, the PIM routers may be modified, to enjoy the example pruning benefits.

Overlay IP networks may be identified by a unique VNI (e.g., a 24-bit field in an encapsulation header). As shown in FIG. 3, let VNI-1010 and VNI-2020 be overlay networks mapped to multicast group address 239.1.1.1. This VNI information may be carried in the VxLAN encapsulation header, so that entities (also referred to as VxLAN Termination EndPoints or VTEPs) in the network that perform the VxLAN encapsulation and decapsulation can recognize the overlay network to which the traffic belongs, and handle the traffic appropriately. For example, a vswitch or a pswitch may serve as a VTEP for a set of overlay and VTEP interconnections. Packet encapsulation, lookups into the physical forwarding tables, injecting packets into the physical network, getting traffic from the physical network, looking up logical interface tables for forwarding information, de-encapsulating packets, and/or pushing packets into the logical network are functions that may be performed by VTEPs.

When a client on an overlay tenant network needs to communicate with another client on the overlay tenant network that is hosted at a different VTEP, the source clients frame is encapsulated by the source VTEP and transported over the underlay network to the target VTEP. The target VTEP in turn de-capsulates the frame and forwards the same to the target client.

When a client sends out BUM traffic that needs to go out to multiple clients on the overlay network, the source VTEP encapsulates frames and sends an IP multicast frame to an underlay IP multicast group address to which all VTEPs carrying traffic for that overlay network are registered. The underlay IP network replicates the frame appropriately and delivers the frames to all registered VTEPs that in-turn de-capsulate them and forward to their local clients.

The VTEPs 351-353 may serve as the multicast clients. Thus, VTEPs 351-353 may send out (or join) to their corresponding routers/gateways 361-363. Such join reports 381-383 (control plane traffic) may serve as a signaling mechanism, which may be sent to the router using IGMP signaling protocol (used between a client and its first-stop router). Between routers, the signaling information (join reports) that the routers got from the clients gets translated into another protocol packet, PIM packet protocol, to be exchanged between the routers 361-363.

More specifically, when the clients (e.g., the VTEPs 351-353) send out the join reports to their corresponding routers, they indicate their readiness to receive traffic (e.g., by indicating their IP address and that they are an end device). Thus, it is possible to qualify the group address with tenant information.

To enjoy scalability, network deployments may share the same IP multicast group address (in the present example, address 239.1.1.1) on the underlay across multiple overlay networks. Host-1 371 is on overlay network VNI-1010 341 behind VTEP-1 351. Host-2 372 is on overlay network VNI-2020 342 behind VTEP-1 351. Host-3 373 is on overlay network VNI-2020 342 behind VTEP-3 353. Host-4 374 is on overlay network VNI-1010 341 behind VTEP-2 352. Thus, VTEP-1 351 will send out multicast group membership join report 381 for 239.1.1.1 IP multicast group address, because VTEP-1 351 has hosts associated to overlay network VNI-1010 341 and VNI-2020 342. Similarly, VTEP-2 352 and VTEP-3 353 also will send out multicast group membership join reports 382, 383 for 239.1.1.1 multicast group address, to receive BUM traffic on the overlay networks. If Host-3 373, associated to overlay network VNI-2020 342 at VTEP-3 353, sends broadcast traffic that needs to be received by hosts in overlay network VNI-2020 342, such data traffic will be encapsulated and sent to destined multicast group address 239.1.1.1.

VTEP-1 351 will receive the data traffic and send traffic to Host-2 372. Without the features described herein, VTEP-2 352 also would have received superfluous data traffic destined for group address 239.1.1.1, because there would be no hosts on overlay network VNI-2020 at VTEP-2 352. This would be wasted bandwidth on the underlay, because VTEP-2 352 does not need such traffic in view of its Host-4 374 being on VNI-101 341.

To avoid such waste according to the present examples, when VTEP-2 352 sends an IGMP multicast group membership report 382 to multicast group address 239.1.1.1, it also can embed the overlay network VNI-1010 341 information in the join report 382. Note that an IGMPv2 or IGMPv3 join report 382 (or other protocol) may be generated. For example, in the case of an IPv6 underlay, the join report 382 may be an MLDv2 report etc.

The IGMP extended multicast group membership join report 382 of VTEP-2 352, having overlay network information VNI-1010 341, may include the following information: Number of VNIs=1; VNI[1]=1010; and Group address=239.1.1.1. Accordingly, Router-2 362 receives the extended IGMPv2 multicast group membership report 382 from VTEP-2 352, and maintains a table mapping VNI information 341 to the IP multicast group address. This may be in addition to the other multicast tables that it already maintains for IP multicast traffic forwarding.

When Router-2 362 receives data traffic packet on an interface (e.g., interface P2), Router-2 362 extracts the VNI information from the frame, checks the group address-to-VNI mapping in its local tables to see if there is an entry, and forwards based on the multicast tables if an entry is available in the VNI information table.

In the scenario above, Router-2 362 would now see that the data traffic 306 is meant for VNI-2020 342 and destination address is 239.1.1.1. With this information, Router-2 362 may perform a lookup on the VNI-Info table first. This lookup fails, as there is no entry for VNI-2020 342 for the 239.1.1.1 group at the Router-2 362. Router-2 362 thereby drops the frame based on the Multicast tables at Router-2 362, instead of forwarding the traffic to VTEP-2 352.

Accordingly, given that Router-2 362 has dropped the traffic at its ingress, the network link between Router-2 362 and VTEP-2 352 does not carry unnecessary/superfluous traffic, and link utilization is improved. Although illustrated as a single hop away from each other in the simplified topology shown in FIG. 3, note that Router-2 362 could have been multiple L2 hops away from VTEP-2 352, in which case the bandwidth savings would have been even more significant by avoiding superfluous traffic on all those links/nodes downstream of Router-2 362. Further, VTEP-2 352 avoids needing to do additional filtering on such superfluous traffic, because the underlay router 362 has already filtered traffic based on VNI information. This enables significant savings, especially for software-based VTEPs (or vSwitches) where server processing cycles do not need to be wasted to perform the VNI-based pruning.

When a given VNI is un-configured on a VTEP, the VTEP can send IGMP group membership leave indication with VNI information. The switch that receives this message can use it to update the VNI information table that will be used in the data plane for traffic pruning. More specifically, appending tenant information in the IGMP group membership report, and by receiving the new report with the tenant information, enables a router to unconfigure the group. Thus, a particular tenant may be removed by sending out the leave request indicating such, to clear a network device's forwarding table of that particular tenant information. Thus, if a network packet is received at that network device for that tenant (no longer downstream of the network device), the network device would prune the traffic and not send it downstream.

The timescales for updating VNI information tables (whether to add or remove) are analogous to timescales for existing protocols such as IGMP. As for scaling, on the order of up to approximately 490 VNIs may be sent in one IGMP group membership report (in view of the IP maximum transmission unit (MTU) of 1500 bytes). Multiple membership reports can be sent, if the number of VNIs on that group exceeds approximately 490.

IP multicast routers can take VNI information, from the IGMP message, and insert it into a PIM protocol message. PIM routers that today build a dense or sparse multicast tree based on {S, G, If} or {*, G, If} may now build multicast trees based on {S, G, If, VNI} or {*, G, If, VNI}, thereby creating distribution trees that take VNI into account (e.g., in addition to the existing attributes).

Thus, in the datacenter space with VxLAN, tenants may be housed behind different physical networks, and broadcasts on a logical network may reach all tenants on that logical network, without imposing superfluous data. Tenant filtering may occur on the VTEPs, pushing VLAN and multicast group tenant information (e.g., as part of IGMP), deeper into the network to filter traffic going downstream to the relevant tenants. Thus, bandwidth is saved on links that are connected between the VTEP and the router. By extension, routers may take the IGMP information from the join reports, and construct the distribution tree by sending out advertisements to peer PIM routers using the PIM protocol.

Example solutions do not need a one-to-one mapping. There may be fewer number of trees in the core compared to the edge, with multiple levels of multiplexing or demultiplexing. For example, one-to-ten coalescing may be present in the network core, in contrast to a 1-to-100 coalescing at the network edge. Thus, holistically across the larger network space, bandwidth savings is heightened for broadcasts throughout the logical network.

Figure 4:
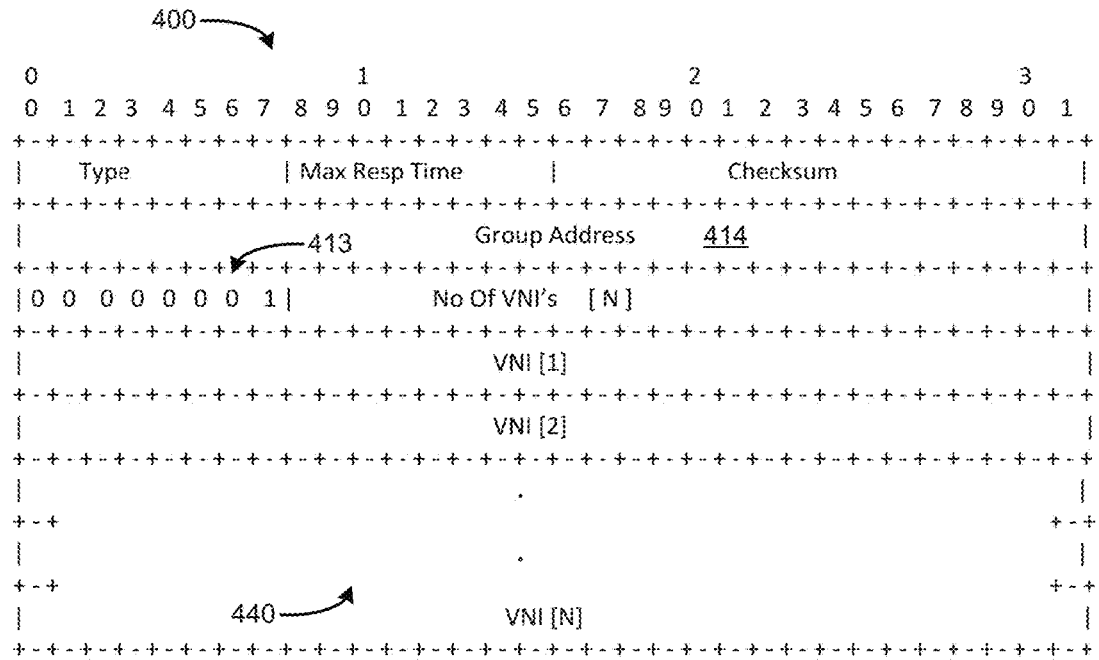
FIG. 4 is a diagram of a multicast group membership report including overlay network information according to an example.

FIG. 4 is a diagram of a multicast group membership report 400 including overlay network information 440 according to an example. The multicast group membership report 400 also includes a VNI flag 413 and a group address 414.

The report 400 may be sent by a network device, which is a router/VTEP described above. The report 400 also may be sent by a client or a tenant itself. Subsequently, the router or the VTEP may periodically send out these group membership reports 400 from the perspective of confirming/echoing what client devices have sent out.

The report 400 includes IGMP multicast group membership information, extended as shown to carry overlay network information 440. IGMP is a protocol that runs on top of IP, and the IP header already would have tenant address information (e.g., as referenced in the mapping table 210 of FIG. 2, showing the VNI 212 and tenant address 216 information). Thus, references to a group membership report as used herein may include the IP headers and the IGMP headers combined (or other applicable protocols), as well as the information contained therein.

The VNI flag 413 includes a least significant bit, used to specify that there is additional tenant information contained in the report 400. The first byte (the first 8 bits) is contained in the extended space of the report 400 as illustrated. The flag 413 contains eight bits, with one bit in use. Thus, usage of the flag 413 is extendable for other purposes as needed in the future based on the seven remaining reserved bits. The number of VNIs [N] is to indicate how many VNIs are to follow, as contained in the report 400.

Thus, protocols such as IGMP and MLD (e.g., distant vector multicast routing protocol (DVMRP) and so on) may use the report 400 to indicate the membership report. Programming/code executed by a network device is to understand the format of the report 400, to be able to extract the overlay network information 440 and populate the overlay network information 440 in the hardware of the network device.

Figure 5:
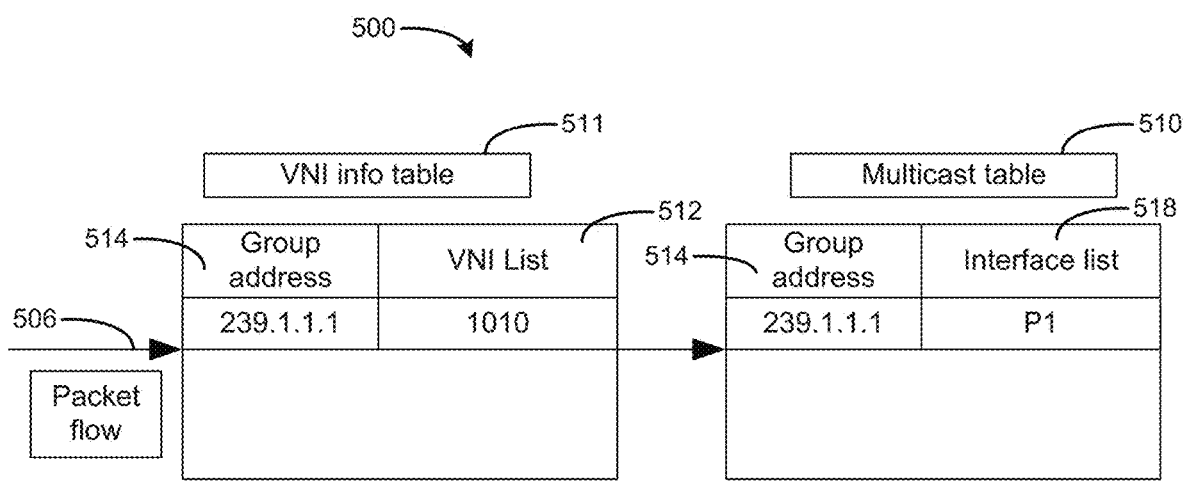
FIG. 5 is a diagram of VNI mapping according to an example.

FIG. 5 is a diagram of VNI mapping 500 according to an example. The VNI mapping 500 includes a VNI info table 511 and a multicast table 510. A network packet 506 is checked against the VNI info table 511, which includes group address 514 and VNI list 512. Packet flow is also checked against the multicast table 510, which includes group address 514 and interface list 518.

A network device, such as a router, may receive a multicast group membership report on interface P1 as part of the packet flow 506. The network device may extract the overlay network information, and map the VNI 512 to multicast group address 514 as shown.

Thus, examples may include the additional VNI information table 511 in the packet forwarding pipeline, e.g., processing through the VNI information table 511 and the multicast table 510. Although illustrated in a particular order, the packet flow 506 is not so limited in alternate examples. Regarding the interface list 518, multiple interfaces may be associated with a network device. For example, two different hosts may be hanging off a network device directly, which is aggregating the multiple host connections through a single link of the network device.

Figure 6:
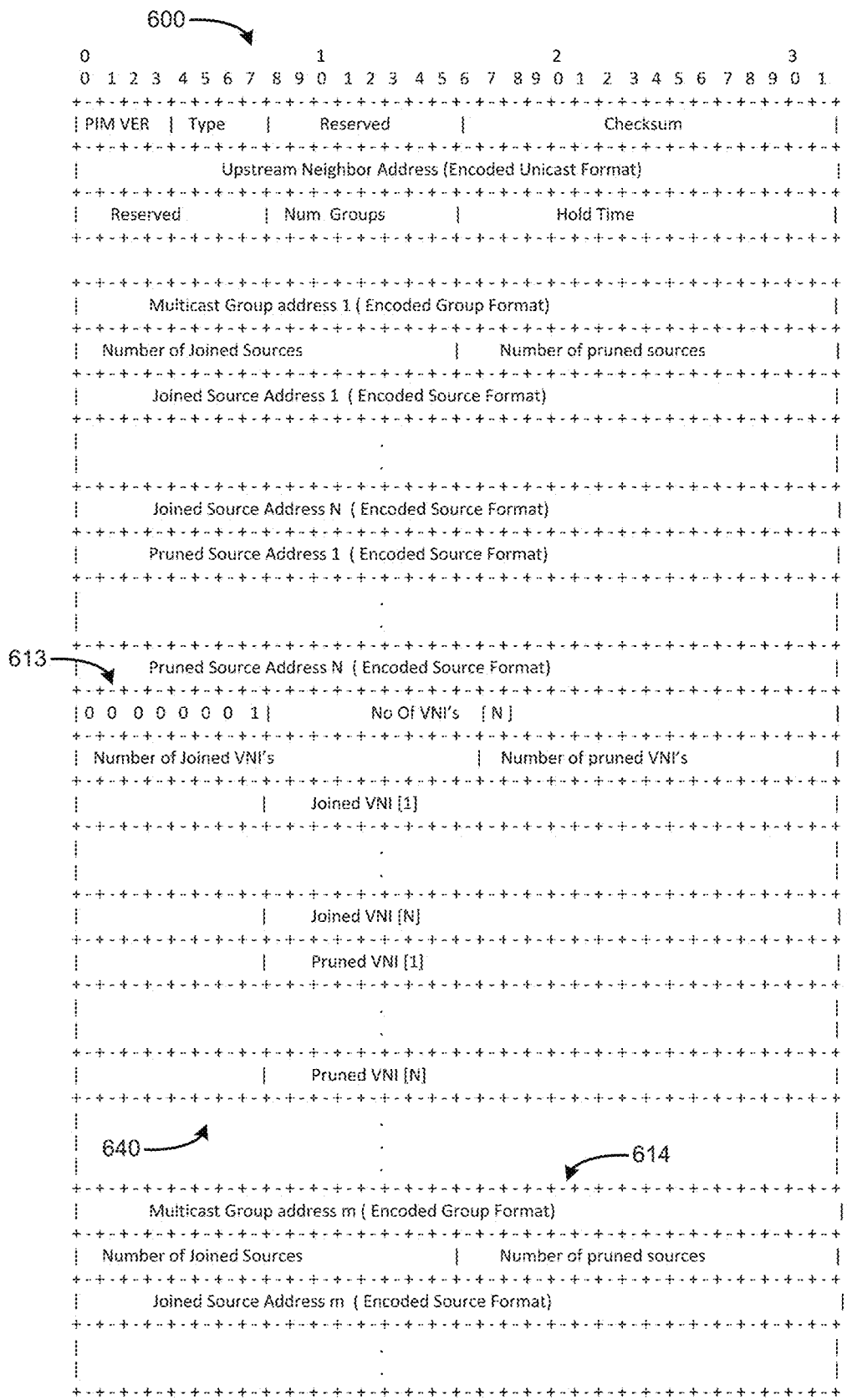
FIG. 6 is a diagram of a PIM join/prune message carrying overlay network information according to an example.

FIG. 6 is a diagram of a PIM join/prune message 600 carrying overlay network information 640 according to an example. The message 600 also includes a VNI flag 613 and a multicast group address information 614. The message 600 illustrates a request for comments (RFC) format of a PIM join/prune message format that is extended as illustrated to carry overlay network information 640.

The PIM message 600 may be handled by PIM routers, e.g., to build an underlay multicast distribution tree for a group address. The underlay multicast distribution tree may be used to forward traffic through the underlay, and may be built in response to joins being sent by clients.

Figure 7:
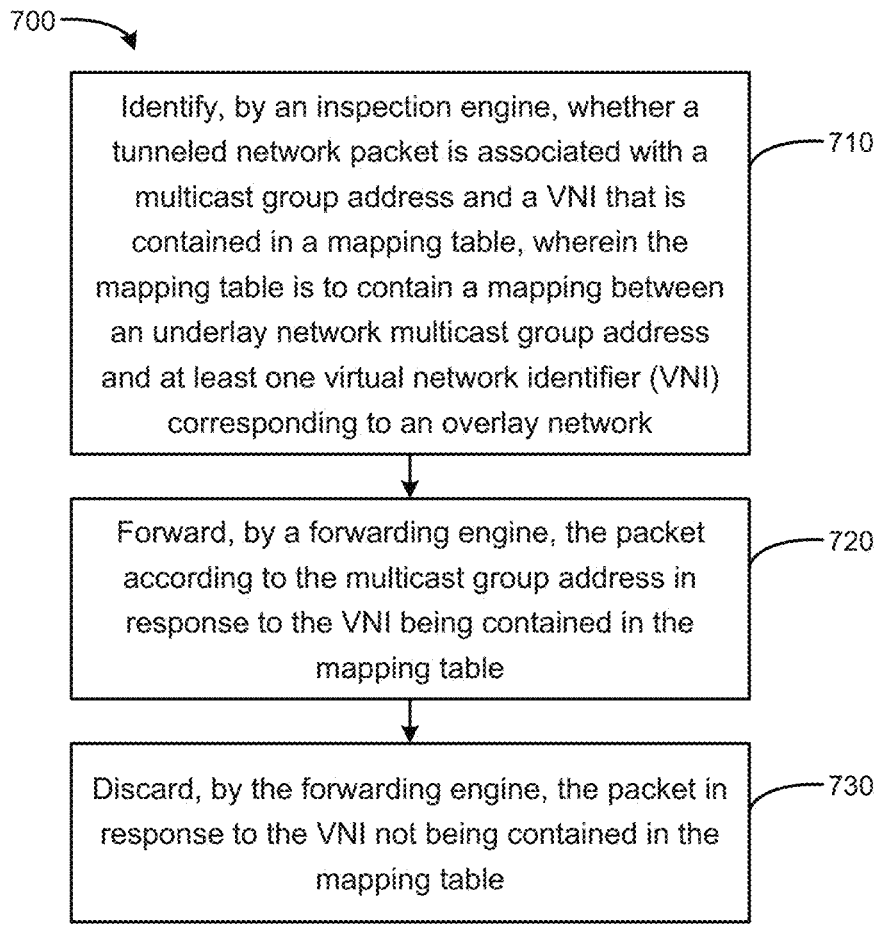
FIG. 7 is a flow chart of an example process for forwarding packets.

Referring to FIG. 7, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 7 is a flow chart of an example process for forwarding packets. In block 710, an inspection engine is to identify whether a tunneled network packet is associated with a multicast group address and a VNI that is contained in a mapping table. The mapping table is to contain a mapping between an underlay network multicast group address and at least one virtual network identifier (VNI) corresponding to an overlay network. For example, a network device may receive a packet and check for the presence of a VNI identifier in the device's mapping table that corresponds to the network packet. In block 720, a forwarding engine is to forward the packet according to the multicast group address in response to the VNI being contained in the mapping table. For example, the network device may locate the VNI in its mapping table, indicating that the packet is to proceed downstream of the network device. In block 730, the forwarding engine is to discard the packet in response to the VNI not being contained in the mapping table. For example, the network device may prune the packet, to avoid superfluous traffic downstream of the network device, due to the packet not destined to travel downstream of the network device based on what VNIs are associated with tenants downstream of the network device.

Examples provided herein may be implemented in hardware, programming, or a combination of both. Example systems can include a processor and memory resources for executing instructions stored in a tangible non-transitory computer-readable media (e.g., volatile memory, non-volatile memory, and/or computer-readable media). Non-transitory computer-readable media can be tangible and have computer-readable instructions stored thereon that are executable by a processor to implement examples according to the present disclosure. The term "engine" as used herein may include electronic circuitry for implementing functionality consistent with disclosed examples. For example, engines 120, 130 of FIG. 1 may represent combinations of hardware devices and programming to implement the functionality consistent with disclosed implementations. In some examples, the functionality of engines may correspond to operations performed by user actions, such as selecting forwarding rules to be executed by processor 202 (described above with respect to FIG. 2).

What is claimed is:

1. A network device comprising:
a mapping table, to contain a mapping between an underlay network multicast group address and at least one virtual network identifier (VNI) corresponding to an overlay network;
an inspection engine to identify whether a tunneled network packet received at the network device is associated with the multicast group address and a VNI that is contained in the mapping table; and
a forwarding engine to forward the packet according to the multicast group address in response to the VNI being contained in the mapping table, and to discard the packet in response to the VNI not being contained in the mapping table.

2. The network device of claim 1, wherein the inspection engine is to receive, from a tenant address, a multicast group membership report including at least one VNI, and the network device is to extract the at least one VNI from the membership report, and incorporate the at least one VNI into the mapping table based on mapping the at least one VNI and tenant address to the multicast group address.

3. The network device of claim 2, wherein the network device is to construct a multicast distribution tree corresponding to the at least one VNI.

4. The network device of claim 2, wherein the membership report is based on at least one of the IGMP and MLD protocols.

5. The network device of claim 2, wherein the network device is to include, in a multicast group membership report, a VNI flag, an indication of the number of VNIs in the multicast group membership report, and a field to contain the at least one VNI and corresponding at least one tenant address.

6. The network device of claim 1, wherein the network device is to, in response to receiving a group membership leave indication from a tenant address, update the mapping table to remove the tenant address and VNI mapping corresponding to the group membership leave indication.

7. The network device of claim 1, wherein the inspection engine is to check for the VNI in a virtual local area network (VxLAN) encapsulation header.

8. The network device of claim 1, wherein the network device is to, in response to receiving broadcast-unicast-multicast (BUM) traffic from a tenant address associated with the VNI, encapsulate the frame and embed the VNI into the frame of the BUM traffic to be sent to the multicast group address.

9. A method comprising:
identifying, by an inspection engine, whether a tunneled network packet is associated with a multicast group address and a VNI that is contained in a mapping table, wherein the mapping table is to contain a mapping between an underlay network multicast group address and at least one virtual network identifier (VNI) corresponding to an overlay network;

forwarding, by a forwarding engine, the packet according to the multicast group address in response to the VNI being contained in the mapping table; and discarding, by the forwarding engine, the packet in response to the VNI not being contained in the mapping table.

10. The method of claim 9, comprising:

receiving, from a tenant address, a multicast group membership report including at least one VNI;

extracting the at least one VNI from the membership report; and incorporating the at least one VNI into the mapping table based on mapping the at least one VNI and tenant address to the multicast group address.

11. The method of claim 9, comprising constructing a multicast distribution tree corresponding to the at least one VNI.

12. The method of claim 9, wherein the membership report is based on at least one of the IGMP and MLD protocols.

13. The method of claim 9, further comprising providing a notification in response to the VNI not being contained in the mapping table, wherein the notification is based on at least one of i) logging an incident, and ii) providing an indication to an administrator regarding network traffic.

14. The method of claim 9, wherein a device that is to host at least one tenant is at least one of a virtual switch (vswitch) and a physical switch (pswitch).

15. A non-transitory machine-readable storage medium encoded with instructions, executable by a computing system to prune overlay network traffic, that when executed cause the computing system to:

identify, by an inspection engine, whether a tunneled network packet is associated with a multicast group address and a VNI that is contained in a mapping table, wherein the mapping table is to contain a mapping between an underlay network multicast group address and at least one virtual network identifier (VNI) and associated at least one tenant address corresponding to an overlay network;

forward, by a forwarding engine, the packet according to the multicast group address in response to the VNI being contained in the mapping table; and discard, by the forwarding engine, the packet in response to the VNI not being contained in the mapping table.

16. The non-transitory storage medium of claim 15, further comprising instructions that cause the computing system to construct the multicast distribution tree.

17. The non-transitory storage medium of claim 15, further comprising instructions that cause the computing system to extract the at least one VNI from the membership report, and incorporate the at least one VNI into the mapping table based on mapping the at least one VNI and corresponding at least one tenant address to the multicast group address.

18. The non-transitory storage medium of claim 15, further comprising instructions that cause the computing system to:

receive a group membership leave indication from a tenant address; and update the mapping table to remove the tenant address and VNI mapping corresponding to the group membership leave indication.

19. The non-transitory storage medium of claim 15, further comprising instructions that cause the computing system to check for the VNI in a virtual local area network (VxLAN) encapsulation header.

20. The non-transitory storage medium of claim 15, further comprising instructions that cause the computing system to:

receive broadcast-unicast-multicast (BUM) traffic from a tenant address associated with the VNI;

encapsulate the frame; and embed the VNI into the frame of the BUM traffic to be sent to the multicast group address.

* * * * *